US012789557B2

(12) United States Patent
Uemura et al.

(10) Patent No.: US 12,789,557 B2
(45) Date of Patent: Nov. 10, 2026

(54) PNEUMATIC TIRE AND METHOD FOR MANUFACTURING PNEUMATIC TIRE

(71) Applicant: The Yokohama Rubber Co., LTD., Tokyo (JP)

(72) Inventors: Takanori Uemura, Hiratsuka (JP); Yuki Suto, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 1271 days.

(21) Appl. No.: 17/256,166

(22) PCT Filed: Apr. 22, 2019

(86) PCT No.: PCT/JP2019/017104

§ 371 (c)(1),
(2) Date: Dec. 24, 2020

(87) PCT Pub. No.: WO2020/008709

PCT Pub. Date: Jan. 9, 2020

(65) Prior Publication Data

US 2021/0260926 A1 Aug. 26, 2021

(30) Foreign Application Priority Data

Jul. 3, 2018 (JP) ................................ 2018-127072

(51) Int. Cl.
*B60C 11/00* (2006.01)
*B29D 30/06* (2006.01)
(Continued)

(52) U.S. Cl.
CPC .......... *B60C 11/0083* (2013.01); *B29D 30/06* (2013.01); *B60C 11/1376* (2013.01);
(Continued)

(58) Field of Classification Search
CPC ............ B60C 11/0083; B60C 11/1376; B60C 2011/0033; B60C 2011/0341; B29D 30/06
See application file for complete search history.

(56) References Cited

U.S. PATENT DOCUMENTS 6,073,668 A * 6/2000 Iwasaki .................. B60C 11/01 152/454
6,575,214 B1 6/2003 Iwasaki et al.
(Continued)

FOREIGN PATENT DOCUMENTS

JP H06-035681 9/1994
JP H08-337101 12/1996
(Continued)

OTHER PUBLICATIONS

Wikipedia "Superellipse", archived version from Nov. 24, 2017, https://web.archive.org/web/20171124173908/https://en.wikipedia.org/wiki/Superellipse, accessed Apr. 12, 2023.*
(Continued)

*Primary Examiner* — Katelyn W Smith
*Assistant Examiner* — Philip N Schwartz
(74) *Attorney, Agent, or Firm* — Thorpe North & Western

(57) ABSTRACT

A pneumatic tire includes a carcass layer, a pair of cross belts disposed on an outer side in a radial direction of the carcass layer, and a tread rubber disposed on the outer side in the radial direction of the cross belts. A tread profile when the tire is mounted on a specified rim, inflated to a specified internal pressure, and in an unloaded state is defined by the following elliptic function ([Mathematical Formula 1]) having a center point on a tire equatorial plane. Here, "a" is the radius in a tire width direction and the major axis, "b" is the radius in the tire radial direction and the minor axis, and conditions of $0<b<a$, $0<x$, $0<y$, $1.00<p$, $1.00<q$ and $p\neq q$ are satisfied.

(Continued)

$$\left(\frac{x}{a}\right)^p + \left(\frac{y}{b}\right)^q = 1$$ [Mathmatical Formula 1]

20 Claims, 8 Drawing Sheets

(51) Int. Cl.
*B60C 11/13* (2006.01)
*B60C 11/03* (2006.01)

(52) U.S. Cl.
CPC ................. *B60C 2011/0033* (2013.01); *B60C 2011/0341* (2013.01)

(56) References Cited

U.S. PATENT DOCUMENTS

| | | | |
|---|---|---|---|
| 2010/0255134 | A1 | 10/2010 | Stuhldreher |
| 2014/0352861 | A1 | 12/2014 | Sabetti |

FOREIGN PATENT DOCUMENTS

| | | | | | |
|---|---|---|---|---|---|
| JP | H10-287106 | | | 10/1998 | |
| JP | 3223134 | | | 10/2001 | |
| JP | 2002-301916 | | | 10/2002 | |
| JP | 2009161001 | A | * | 7/2009 | ............. B60C 11/11 |
| JP | 2015-506867 | | | 3/2015 | |
| WO | WO 2008/147500 | | | 12/2008 | |
| WO | WO 2013/108195 | | | 7/2013 | |

OTHER PUBLICATIONS

International Search Report for International Application No. PCT/JP2019/017104 dated Jul. 23, 2019, 3 pages, Japan.

* cited by examiner

| | CONVENTIONAL EXAMPLE 1 | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 |
|---|---|---|---|---|---|---|---|---|---|---|---|---|
| TREAD PROFILE | ELLIPSE (p=q) | SUPER-ELLIPSE | SUPER-ELLIPSE | SUPER-ELLIPSE | SUPER-ELLIPSE | SUPER-ELLIPSE | SUPER-ELLIPSE | SUPER-ELLIPSE | SUPER-ELLIPSE | SUPER-ELLIPSE | SUPER-ELLIPSE | SUPER-ELLIPSE |
| a/SW | 0.43 | 0.65 | 0.50 | 0.45 | 0.50 | 0.50 | 0.50 | 0.50 | 0.50 | 0.55 | 0.43 | 0.56 |
| b/a | 0.10 | 0.40 | 0.40 | 0.30 | 0.20 | 1.10 | 0.90 | 0.90 | 0.90 | 0.74 | 0.11 | 1.17 |
| p | 2.00 | 3.00 | 3.00 | 2.50 | 3.00 | 3.00 | 3.00 | 4.50 | 6.00 | 3.00 | 2.50 | 3.00 |
| q | 2.00 | 2.00 | 4.00 | 5.00 | 1.80 | 12.0 | 9.50 | 6.00 | 4.00 | 5.50 | 1.50 | 8.70 |
| b/q | 5.46 | 31.9 | 12.3 | 6.62 | 13.6 | 11.2 | 11.6 | 18.4 | 27.6 | 18.1 | 7.73 | 18.5 |
| CORNERING PERFORMANCE | 100 | 102 | 102 | 102 | 104 | 106 | 105 | 106 | 102 | 105 | 103 | 108 |
| WEAR RESISTANCE PERFORMANCE | 100 | 101 | 103 | 102 | 104 | 103 | 105 | 104 | 102 | 105 | 106 | 108 |

FIG. 8

PNEUMATIC TIRE AND METHOD FOR MANUFACTURING PNEUMATIC TIRE

TECHNICAL FIELD

The technology relates to a pneumatic tire and a method for manufacturing the pneumatic tire, and particularly relates to a pneumatic tire that can improve tire cornering performance and a method for manufacturing the pneumatic tire.

BACKGROUND ART

In recent years, from the perspective of enhancing steering stability performance during high-speed travel, the tread profile of a pneumatic tire has been improved to enhance tire grounding characteristics and improve cornering performance. Conventional pneumatic tires that address this need are described in Japan Utility Patent Model Publication No. 6-35681 and Japan Patent No. 3223134.

SUMMARY

The technology provides a pneumatic tire that can improve tire cornering performance and a method for manufacturing the pneumatic tire.

A pneumatic tire according to this technology is a pneumatic tire including a carcass layer, a pair of cross belts disposed on an outer side in a radial direction of the carcass layer, and a tread rubber disposed on the outer side in the radial direction of the pair of cross belts, a tread profile when the tire is mounted on a specified rim, inflated to a specified internal pressure, and in an unloaded state, being defined by an elliptic function below having a center point on a tire equatorial plane. Here, “a” is a radius in a tire width direction and a major axis, “b” is a radius in a tire radial direction and a minor axis, and conditions of 0<b<a, 0<x, 0<y, 1.00<p, 1.00<q, and p≠q are satisfied.

$$\left(\frac{x}{a}\right)^p + \left(\frac{y}{b}\right)^q = 1 \quad \text{[Mathmatical Formula 1]}$$

A method for manufacturing a pneumatic tire according to this technology is a method for manufacturing a pneumatic tire including a carcass layer, a pair of cross belts disposed on an outer side in a radial direction of the carcass layer, and a tread rubber disposed on the outer side in the radial direction of the pair of cross belts, a tread profile when the tire is mounted on a specified rim, inflated to a specified internal pressure, and in an unloaded state, being defined by an elliptic function below having a center point on a tire equatorial plane. Here, “a” is a radius in a tire width direction and a major axis, “b” is a radius in a tire radial direction and a minor axis, and conditions of 0<b<a, 0<x, 0<y, 1.00<p, 1.00<q, and p≠q are satisfied.

$$\left(\frac{x}{a}\right)^p + \left(\frac{y}{b}\right)^q = 1 \quad \text{[Mathmatical Formula 1]}$$

In the pneumatic tire and the method for manufacturing the pneumatic tire according to the technology, a tire contact patch shape is flat, that is, a ground contact length of a ground contact region is made uniform and a ground contact pressure distribution is made uniform. Due to this, there is an advantage that cornering performance of a tire is improved.

BRIEF DESCRIPTION OF DRAWINGS

FIG. 8 is a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
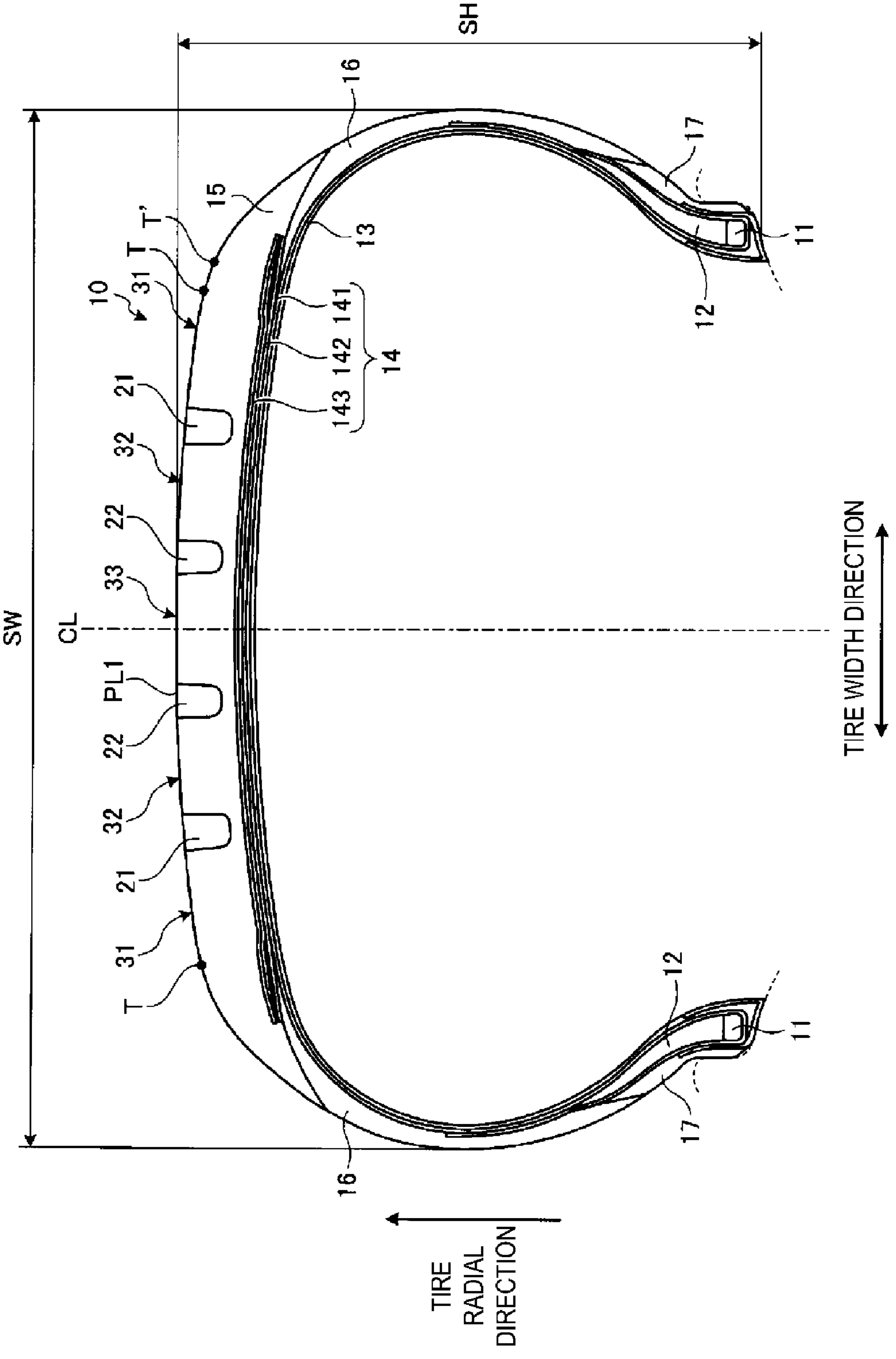
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in the tire radial direction. Also, the same drawing illustrates a radial tire for a passenger vehicle as an example of a pneumatic tire.

In reference to the same drawing, “cross section in a tire meridian direction” refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. Reference sign T denotes a tire ground contact edge. “Tire width direction” refers to the direction parallel with the tire rotation axis. “Tire radial direction” refers to the direction perpendicular to the tire rotation axis.

The pneumatic tire 1 has an annular structure with the tire rotation axis as its center and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are formed by winding one or a plurality of bead wires made from steel in an annular shape and in multiple layers, and are embedded in a bead portion to form a core of the left and right bead portions. The pair of bead fillers 12, 12 are disposed outward of the pair of bead cores 11, 11 in the tire radial direction and reinforce the bead portions.

The carcass layer 13 has a single layer structure made from one carcass ply or a multilayer structure made from a plurality of stacked carcass plies, and spans between the left and right bead cores 11, 11 in a toroidal shape to form the framework of the tire. Additionally, both end portions of the carcass layer 13 are turned back to an outer side in the tire width direction so as to wrap around the bead cores 11 and the bead fillers 12 and fixed. The carcass ply of the carcass layer 13 is formed by rolling coating-rubber-covered carcass cords made from steel or an organic fiber material (for example, aramid, nylon, polyester, rayon, or the like) and has a carcass angle (defined as the inclination angle in the longitudinal direction of the carcass cords with respect to the tire circumferential direction) ranging from 80° to 90° in an absolute value.

The belt layer 14 is a multilayer structure including a pair of cross belts 141, 142 and a belt cover 143 and is disposed around the outer circumference of the carcass layer 13. The pair of cross belts 141, 142 are made by performing a rolling process on coating rubber-covered belt cords made of steel or an organic fiber material. The cross belts 141, 142 have a belt angle, as an absolute value, ranging from 20 degrees to 55 degrees. Furthermore, the pair of cross belts 141, 142 have belt angles (defined as the inclination angle in the longitudinal direction of the belt cords with respect to the tire circumferential direction) of opposite signs and are stacked so that the longitudinal directions of the belt cords intersect each other (a so-called crossply structure). The belt cover 143 is made by coating belt cover cords made from steel or an organic fiber material with a coating rubber and has a belt angle ranging from 0° to 10° in an absolute value. The belt cover 143 is, for example, a strip material formed by coating one or more belt cover cords with a coating rubber and may be formed by winding the strip material spirally on the outer circumferential surface of the cross belts 141, 142 multiple times in the tire circumferential direction. The belt cover 143 is disposed to cover the entire region of the cross belts 141, 142.

The tread rubber 15 is disposed outward of the carcass layer 13 and the belt layer 14 in the tire radial direction and constitutes a tread portion of the tire. The pair of sidewall rubbers 16, 16 are disposed on the outer side of the carcass layer 13 in the tire width direction and constitute left and right sidewall portions. The pair of rim cushion rubbers 17, 17 are disposed on an inner side in the tire radial direction of the turned back portions of the carcass layer 13 and the left and right bead cores 11, 11 to form a rim-fitting surface of the bead portion.

The pneumatic tire 1 includes a plurality of circumferential main grooves 21, 22 extending in the tire circumferential direction and a plurality of land portions 31, 32 defined in the circumferential main grooves 21, 22, the plurality of circumferential main grooves 21, 22 and the plurality of land portions 31, 32 being provided in a tread surface. "Main groove" refers to a groove on which a wear indicator must be provided as specified by JATMA (The Japan Automobile Tyre Manufacturers Association, Inc.) and typically has a groove width of 3.0 mm or greater and a groove depth of 5.0 mm or greater.

The groove width is the maximum distance between the left and right groove walls at the groove opening portion and is measured when the tire is mounted on a specified rim, inflated to the specified internal pressure, and in an unloaded state. In a configuration in which the land portions include notch portions or chamfered portions in the edge portions thereof, the groove width is measured with reference to the intersection points between the tread contact surface and the extension lines of the groove walls as measurement points, in a cross-sectional view in which the groove length direction is a normal direction. In a configuration in which the grooves extend in a zigzag shape or a wave shape in the tire circumferential direction, the groove width is measured with reference to the center line of the oscillation of the groove walls as measurement points.

The groove depth is the maximum distance from the tread contact surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

"Specified rim" refers to a "standard rim" defined by JATMA, a "Design Rim" defined by TRA (The Tire and Rim Association, Inc.), or a "Measuring Rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 kPa, and the specified load is 88% of the maximum load capacity.

For example, in the configuration of FIG. 1, the left and right regions of the pneumatic tire 1 demarcated by the tire equatorial plane CL each include two circumferential main grooves 21, 22. These circumferential main grooves 21, 22 are disposed in left-right symmetry with respect to the tire equatorial plane CL. Five rows of land portions 31 to 33 are defined by these circumferential main grooves 21, 22. In addition, one land portion 33 is disposed on the tire equatorial plane CL.

However, the configuration is not limited thereto and three or five or more circumferential main grooves may be disposed (not illustrated). In addition, the land portion may be arranged at a position off from the tire equatorial plane CL, with one circumferential main groove being arranged on the tire equatorial plane CL (not illustrated).

Among the two or more circumferential main grooves (including the circumferential main grooves disposed on the tire equatorial plane CL) disposed in one region demarcated by the tire equatorial plane CL, a circumferential main groove located on the outermost side in the tire width direction is defined as an outermost circumferential main groove. The outermost circumferential main groove is defined in each of the left and right regions demarcated by the tire equatorial plane CL.

In the configuration of FIG. 1, the distance (dimension symbol omitted in the drawing) from the tire equatorial plane CL to the groove center line of the left and right outermost circumferential main grooves 21, 21 is in a range of from 26% or greater to 32% or smaller of a tire ground contact width (dimension symbol omitted in the drawing). The distance from the tire equatorial plane CL to the groove center line of the center main grooves 22, 22 is in a range of from 8% or greater to 12% or smaller of the tire ground contact width. Note that in the configuration of FIG. 1, one outermost circumferential main groove 21 may be a narrow groove (not illustrated) rather than a main groove.

The groove center line of the circumferential main groove is defined as a straight line parallel to the tire circumferential direction passing through the midpoint of the left and right measurement points of the groove width of the circumferential main groove.

The tire ground contact width is measured as the maximum linear distance in the tire axial direction of a contact surface between the tire and a flat plate when the tire is mounted on a specified rim, inflated to the specified internal pressure, placed perpendicular to the flat plate in a static state, and loaded with a load corresponding to the specified load.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state, and loaded with a load corresponding to the specified load.

The land portions 31, 31 located on the outer side in the tire width direction defined in the outermost circumferential main grooves 21, 21 are defined as shoulder land portions. The shoulder land portions 31, 31 are land portions on the outermost sides in the tire width direction and are located on the tire ground contact edges T.

The land portions 32, 32 located on the inner side in the tire width direction defined in the outermost circumferential main grooves 21, 21 are defined as second land portions. Accordingly, the second land portions 32, 32 are adjacent to the shoulder land portions 31, 31 with the outermost circumferential main grooves 21, 21 disposed therebetween.

The land portion 33 located closer to the tire equatorial plane CL than the second land portions 32, 32 is defined as a center land portion. The center land portion 33 may be disposed on the tire equatorial plane CL (see FIG. 2) or may be arranged at a position off from the tire equatorial plane CL (not illustrated).

Note that in a configuration including four circumferential main grooves 21, 21 (see FIG. 1), a pair of second land portions 32, 32 and a single center land portion 33 are formed. For example, in a configuration including five or more circumferential main grooves, two or more rows of center land portions are formed (not illustrated). In a configuration including three circumferential main grooves, the second land portion also serves as the center land portion (not illustrated).

The land portions 31 to 35 may be ribs that are continuous in the tire circumferential direction and may be block rows divided in the tire circumferential direction by lug grooves (not illustrated).

Tread Profile

Figure 2:
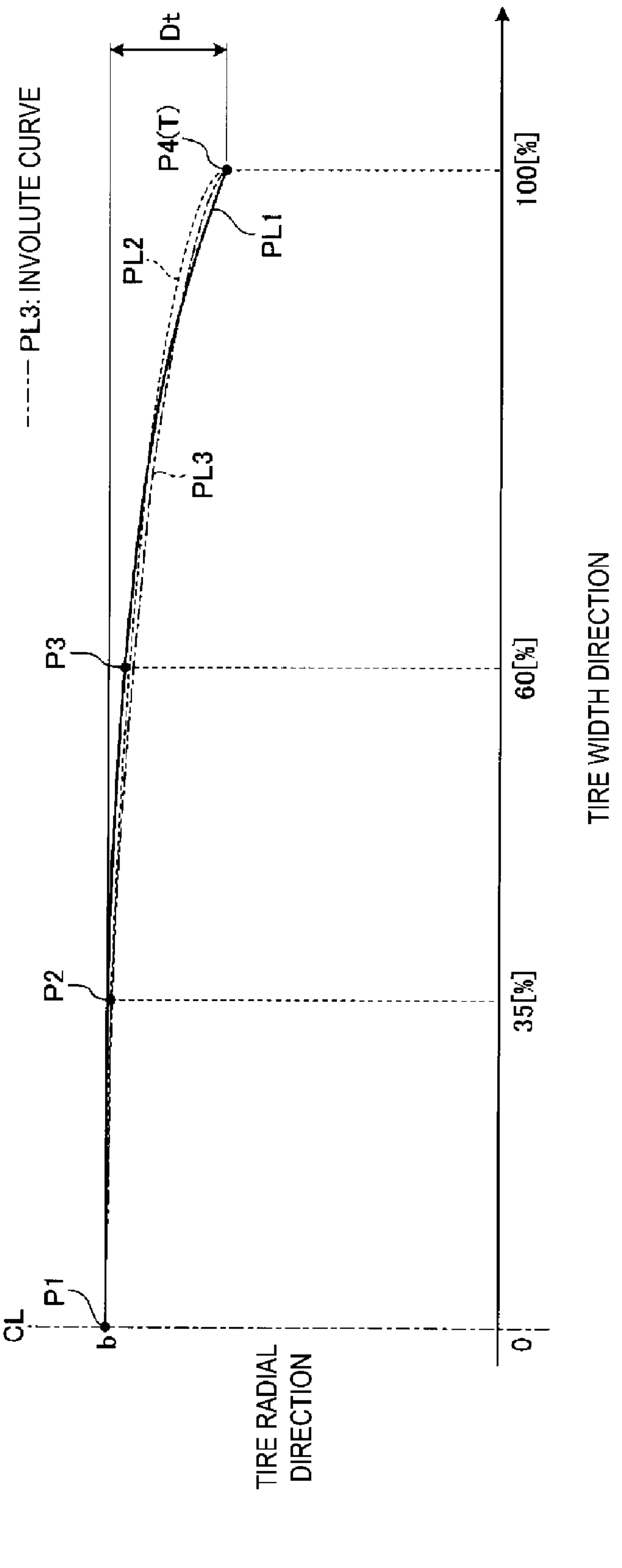
FIG. 2 is an explanatory diagram illustrating a tread profile of the pneumatic tire illustrated in FIG. 1.

FIG. 2 is an explanatory diagram illustrating a tread profile of the pneumatic tire illustrated in FIG. 1. The same drawing illustrates the tread profile of a ground contact region on one side demarcated by the tire equatorial plane. The horizontal axis indicates the position in the tire width direction from the tire equatorial plane CL, and the vertical axis indicates the position in the tire radial direction with respect to the position of the distance b (mm) from the intersection point P1 between the tread profile and the tire equatorial plane as the origin point O.

In FIG. 2, a tread profile PL1 is the profile of the pneumatic tire 1 illustrated in FIG. 1 and is defined by the following super-elliptic function having a center point (the origin point O) on the tire equatorial plane CL. Here, a (mm) is the radius in the tire width direction and the major axis, and b (mm) is the radius in the tire radial direction and the minor axis, and a condition of $0<b<a$ is satisfied. Moreover, indices p and q satisfy the conditions of $1.00<p$, $1.00<q$, and $p\neq q$. Furthermore, the distances x (mm) and y (mm) satisfy the conditions of $0<x$ and $0<y$.

$$\left(\frac{x}{a}\right)^p+\left(\frac{y}{b}\right)^q=1 \quad \text{[Mathmatical Formula 1]}$$

A tread profile is a contour line of the tread surface in a cross-sectional view along the tire meridian direction, and is measured using a laser profiler in an unloaded state with the tire mounted on a specified rim and inflated to the specified internal pressure. The laser profiler used may be, for example, a tire profile measuring device (available from Matsuo Co., Ltd.).

A radius a in the tire width direction preferably has a relationship of $0.30\leq a/SW\leq 0.60$ with respect to a total tire width SW (see FIG. 1) and more preferably, a relationship of $0.35\leq a/SW\leq 0.50$. Therefore, the radius a in the tire width direction is set in relationship with the tire size. The tire ground contact width is ensured and the cornering force during cornering is ensured due to the lower limit described above. The ground contact pressure distribution in the tire ground contact region is made uniform, and the cornering force during cornering is ensured due to the upper limit described above.

The total tire width SW is measured as a linear distance (including all portions such as letters and patterns on the tire side surface) between the sidewalls when the tire is mounted on a specified rim, inflated to the specified internal pressure, and in an unloaded state.

The index p is preferably in a range of $1.00<p\leq 7.00$, and more preferably in a range of $2.00\leq p\leq 6.00$. The larger the index p, the smaller the amount of depression of the tread profile PL1 in a tread portion center region. The tire ground contact width is ensured, and the cornering force during cornering is ensured due to the lower limit described above. Particularly, the turning performance of the tire is increased effectively when the index p is in a range of $4.05\leq p$, and more preferably in a range of $5.01\leq p$. The ground contact pressure distribution in the tire ground contact region is made uniform, and the cornering force during cornering is ensured due to the upper limit described above.

A radius b in the tire radial direction preferably has a relationship of $0.10\leq b/a\leq 1.20$ with respect to the radius a in the tire width direction, and more preferably has a relationship of $0.56\leq b/a\leq 1.10$. The profile shape of the tread portion shoulder region is made appropriate due to the lower limit described above, and the ground contact pressure distribution is made appropriate and the cornering force increases due to the upper limit described above.

The radius b in the tire radial direction has a relationship of $1.00<b/q\leq 30.0$ with respect to an index q. The ratio b/q preferably has a relationship of $2.00\leq b/q\leq 28.0$, and more preferably has a relationship of $6.00\leq b/q\leq 26.0$. The amount of shoulder drop in the tread shoulder region is made appropriate due to the lower limit described above, and the ground contact area during traveling straight and the ground contact area during cornering are achieved in a compatible manner due to the upper limit described above.

The index q is preferably in a range of $1.00\leq q\leq 8.00$, and more preferably is in a range of $4.05\leq q\leq 7.50$. The larger the index q, the smaller the amount of depression of the tread profile PL1 in the tread portion shoulder region. The tire ground contact width is ensured due to the lower limit described above, and the ground contact pressure distribution is made uniform due to the upper limit described above. Particularly, the ground contact pressure distribution is made further uniform and the cornering force increases when the index q is in a range of 4.05≤q (more preferably 4.20≤q).

In FIG. 2, when the tire size is 245/40R18 97Y and the tire ground contact width is 210 mm, the tread profile PL1 is defined by the super-elliptic function, the radii a, b are set to a=136.28 mm and b=121.85 mm, and the indices p and q are set to p=2.99 and q=6.57. Points P1 to P4 are points on the tread profile PL1 at positions 0%, 35%, 60% and 100% of the tire ground contact width from the tire equatorial plane CL.

An imaginary profile PL2 is formed from an elliptic function and matches the tread profile PL1 at the point P1 on the tire equatorial plane CL and the point P4 on the tire ground contact edge T, and the indices p and q are set to p=2.00 and q=2.00.

An imaginary profile PL3 is formed from an involute curve and matches the tread profile PL1 at the point P1 on the tire equatorial plane CL and the point P4 on the tire ground contact edge T, and the mathematical formula is set to (X−105.27)^2/(105.27)^2+Y^2/(19.15)^2.

Figure 3:
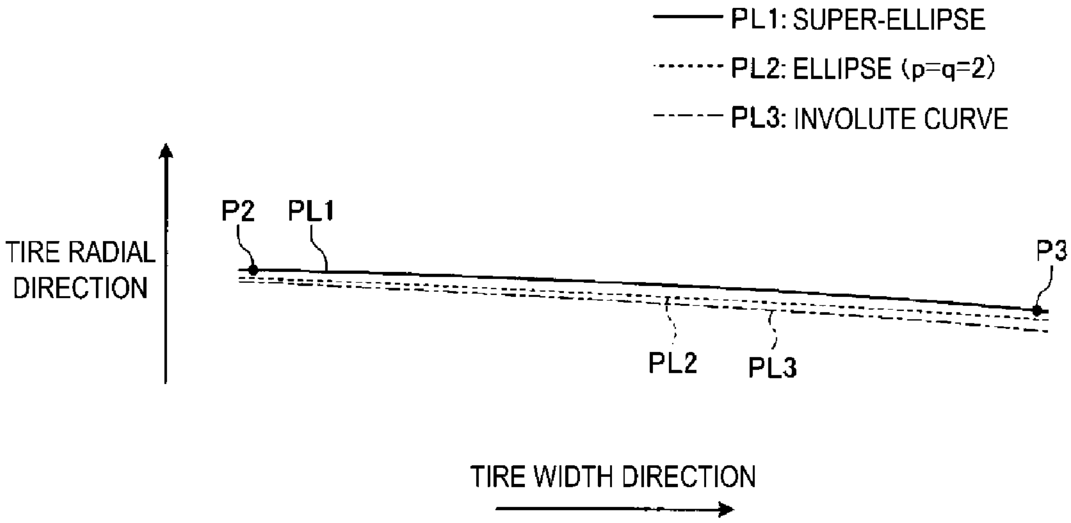
FIG. 3 is an enlarged view illustrating main parts of the explanatory diagram illustrated in FIG. 2.

FIG. 3 is an enlarged view illustrating main parts of the explanatory diagram illustrated in FIG. 2. The same drawing illustrates an enlarged view of the tread profiles PL1 to PL3 in a region of from 35% to 60% of the distance from the tire equatorial plane CL to the tire ground contact edge T.

As illustrated in FIGS. 2 and 3, the tread profile PL1 formed from a super-elliptic function has a shape offset toward the outer side in the tire radial direction with respect to the other imaginary profiles PL2 and PL3 (that is, has a large outer diameter in the tire radial direction) in a region of from 30% or greater to 65% or smaller (at least from 35% or greater to 60% or smaller) of the distance from the tire equatorial plane CL to the tire ground contact edge T. In such a configuration, the contact patch shape in the tread portion center region is flat, that is, the ground contact length of a center region is made uniform, and the ground contact pressure distribution is made uniform. Due to this, uneven wear in the tread portion center region is suppressed.

As illustrated in FIG. 2, the tread profile PL1 has a shape offset toward the inner side in the tire radial direction with respect to the other imaginary profiles PL2 and PL3 in a region at or near the tire ground contact edge T, specifically, in a region of 95% or greater of the distance from the tire equatorial plane CL to the tire ground contact edge T. In this configuration, concentration of the ground contact pressure at the tire ground contact edge is alleviated, and the ground contact pressure during application of a lateral force is made uniform. In this way, the cornering force increases.

Figure 4:
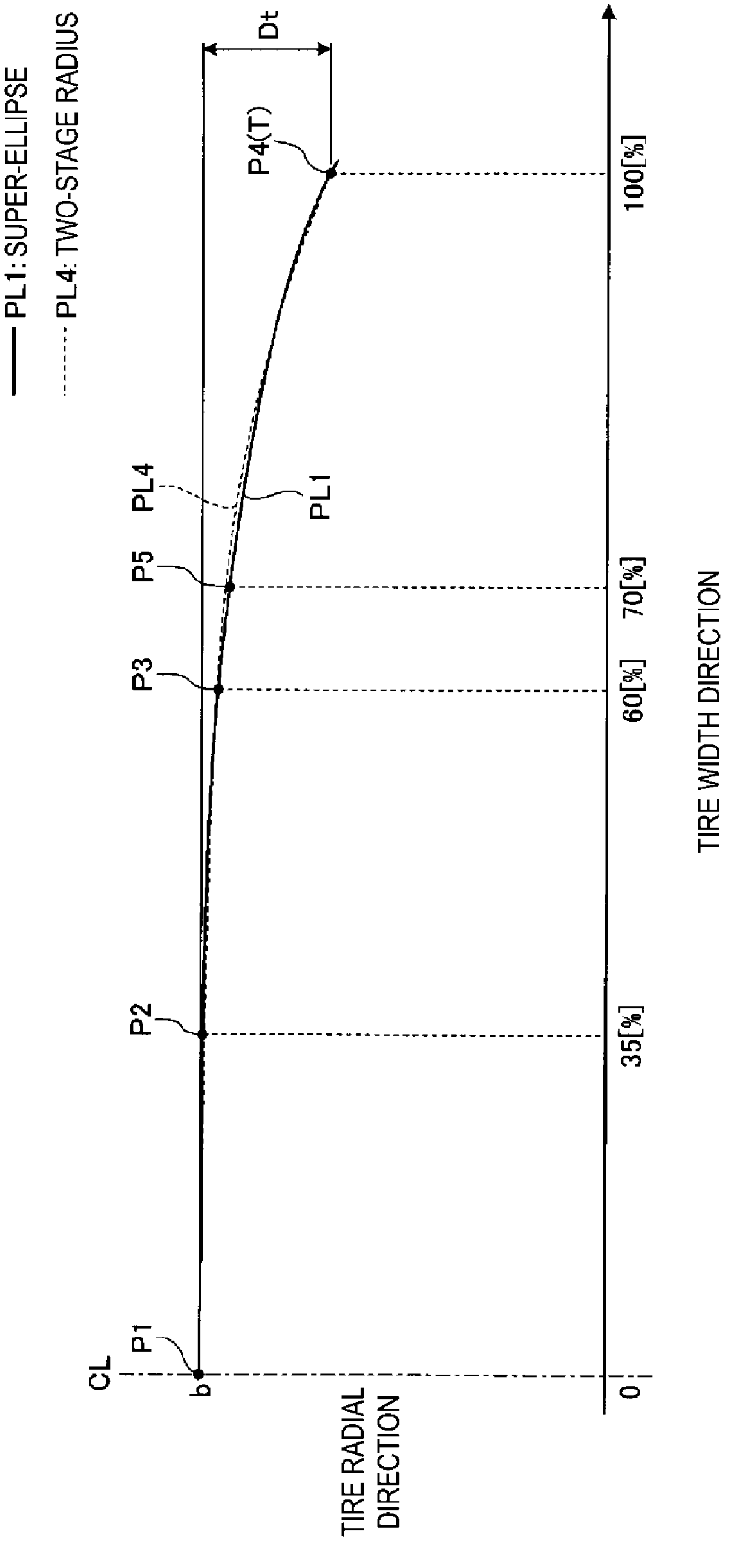
FIG. 4 is an explanatory diagram illustrating a tread profile of the pneumatic tire illustrated in FIG. 2.
Figure 5:
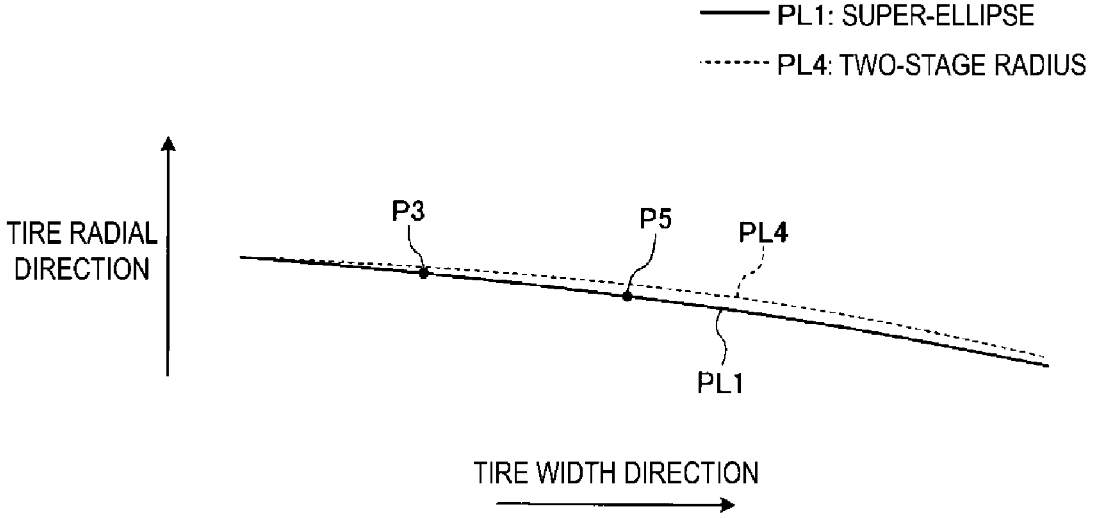
FIG. 5 is an enlarged view illustrating main parts of the explanatory diagram illustrated in FIG. 4.

FIG. 4 is an explanatory diagram illustrating the tread profile of the pneumatic tire illustrated in FIG. 1. FIG. 5 is an enlarged view illustrating main parts of the explanatory diagram illustrated in FIG. 4. The same drawing illustrates an enlarged view of the tread profiles PL1 and PL4 in a region including the points P3 and P5 at positions of 60% and 70% of the distance from the tire equatorial plane CL to the tire ground contact edge T.

In FIG. 4, the tread profile PL1 is the same as that illustrated in FIG. 2.

An imaginary profile PL4 is a profile formed from a so-called two-stage radius, and is formed by connecting two types of arcs with different diameters. In the configuration of FIG. 4, the imaginary profile PL4 includes a first arc with a large diameter (reference sign omitted in the drawings) that constitutes the profile of the tread portion center region and a second arc with a small diameter that mainly constitutes the tread portion shoulder region. The first and second arcs are connected at the position (point P3) of 60% of the distance from the tire equatorial plane CL to the tire ground contact edge T to form one tread profile. The first and second arcs have radii of curvature of 1300 mm and 140 mm, respectively, and have centers on the inner side in the tire radial direction. The imaginary profile PL4 matches the tread profile PL1 at the point P1 on the tire equatorial plane CL and the point P4 on the tire ground contact edge T.

As illustrated in FIGS. 4 and 5, the tread profile PL1 formed from a super-elliptic function has a shape that is substantially the same as the imaginary profile PL4 in a region of 0% to 60% of the distance from the tire equatorial plane CL to the tire ground contact edge T and has a shape that is offset toward the inner side in the tire radial direction with respect to the imaginary profile PL4 in a region on the outer side in the tire width direction from the position of 60% which is a connection point of the first and second arcs (that is, the inflection point of the two-stage radius). This is because the imaginary profile PL4 formed from the two-stage radius is disposed so as to protrude to the outer side in the tire radial direction at or near the connection point of the first and second arcs since the second arc has a small diameter.

In the configuration described above, the tread profile PL1 formed from a super-elliptic function has a smooth shape in a region of 60% to 70% of the distance from the tire equatorial plane CL to the tire ground contact edge T as compared to the imaginary profile PL4 formed from a two-stage radius. Due to this, the amount of change in the ground contact length in a boundary portion between the tread portion center region and the shoulder region is decreased, and uneven wear of the tire is suppressed.

Note that the configuration is not limited thereto, and the tread profile PL1 may be configured by approximating the super-elliptic function by using four or more connected arcs (not illustrated). Such a configuration can also solve the problem of the imaginary profile PL4 formed from the two-stage radius described above. The manufacturing process of the tire mold can be simplified.

The center coordinate and the radius of curvature of the arc used in the approximation can be calculated using, for example, a mathematical calculation method or a geometric calculation method. The distance between the arc used for approximation and the portion of the reference contour line PL1 is preferably 0.2 mm or smaller, and more preferably 0.1 mm or smaller. As a result, the portion of the reference contour line PL1 is appropriately approximated.

In the configuration described above, the tread profile PL1 is preferably defined by the super-elliptic function in the entire region of the tire ground contact region at a camber angle of 0°. Due to this, the tread profile in the tire ground contact region is made appropriate.

The camber angle can be displayed, for example, in the form of marks or recesses and protrusions provided on the sidewall portion of the tire or a catalog attached to the tire as a tire mounting structure at the time of mounting on a vehicle.

The tread profile PL1 is preferably defined by the super-elliptic function in the ground contact region from the tire equatorial plane CL to the camber angle of 4°. Specifically, the tread profile PL1 formed from a super-elliptic function extends beyond the tire ground contact edge T to a predetermined position on the outer side in the tire width direction (specifically, the tire ground contact edge T' at the camber angle of 4° in FIG. 1). As a result, the tread profile is made appropriate, and the steering stability performance, the circuit running performance, and the wear resistance performance of the tire are improved.

Tread Gauge

Figure 6:
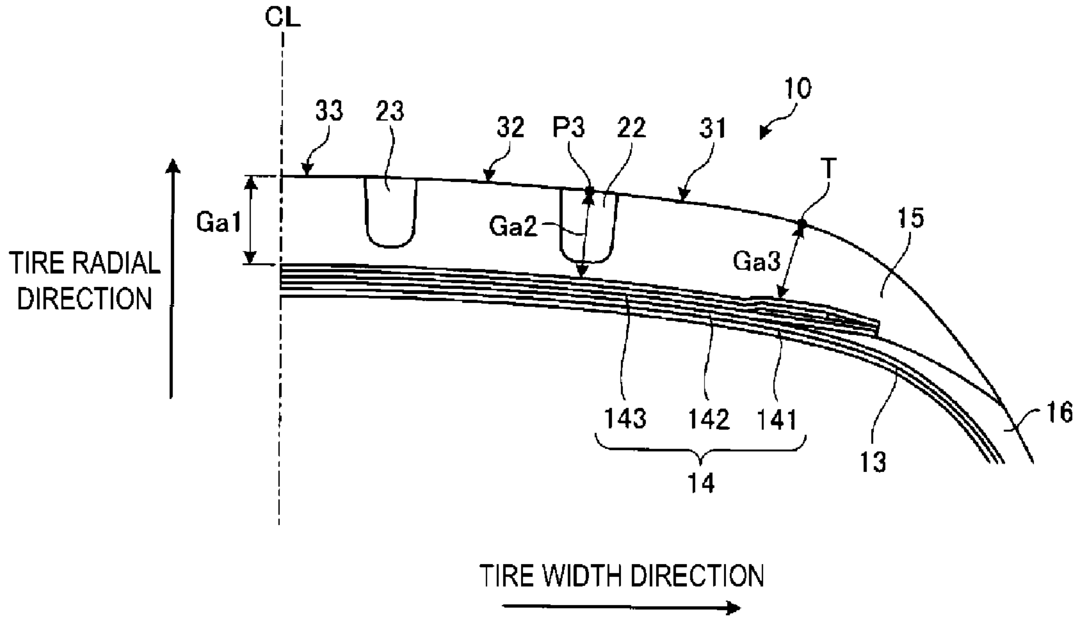
FIG. 6 is an enlarged view illustrating a tread portion of the pneumatic tire illustrated in FIG. 1.

FIG. 6 is an enlarged view illustrating the tread portion of the pneumatic tire illustrated in FIG. 1. The same drawing illustrates the half region demarcated by the tire equatorial plane CL.

In the configuration of FIG. 6, a tread gauge Ga1 in the tire equatorial plane CL, a tread gauge Ga2 at the position (point P3 in FIG. 2) of 60% of the distance from the tire equatorial plane CL to the tire ground contact edge T, and a tread gauge Ga3 at the tire ground contact edge T preferably have a relationship of Ga3<Ga2≤Ga1, and more preferably have a relationship of Ga3<Ga2<Ga1. In this configuration, since the tread gauges Ga1 to Ga3 decrease as they advance from the tread portion center region toward the shoulder region, the tire ground contact pressure is made uniform.

When viewed in a cross-sectional view in the tire meridian direction, the tread gauge is measured as the length of a perpendicular line drawn from a measurement point on the tread profile to a belt cord surface of a belt ply located on the outermost side in the tire radial direction of the belt layer. The belt cord surface is defined as a surface including the end portions on the outer side in the tire radial direction of the plurality of belt cords constituting the belt ply.

An average tread gauge Ga2_*av* in a region of 0% or greater and smaller than 50% of the distance from the tire equatorial plane CL to the tire ground contact edge T, an average tread gauge Ga2_*av* in a region of 50% or greater and smaller than 80% of the distance, and an average tread gauge Ga3_*av* in the region of 80% or greater and 100% or smaller preferably have a relationship of Ga3_*av*<Ga2_*av*≤Ga1_*av*, and more preferably have a relationship Ga3_*av*<Ga2_*av*<Ga1_*av*.

Bulging Portion of Road Contact Surface

Figure 7:
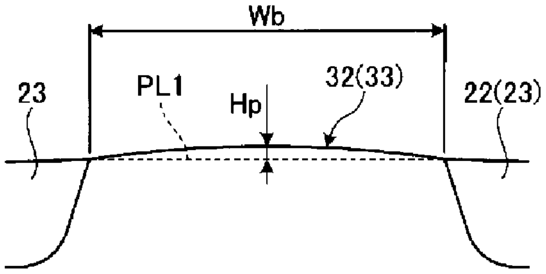
FIG. 7 is an explanatory diagram illustrating a modified example of the pneumatic tire illustrated in FIG. 1.

FIG. 7 is an explanatory diagram illustrating a modified example of the pneumatic tire illustrated in FIG. 1. The same drawing illustrates an enlarged view of the road contact surface of the land portion 32 (33) in a cross-sectional view from the tire meridian direction, and illustrates the bulging portion of the road contact surface of the land portion 32 (33) in an exaggerated manner.

As illustrated in FIG. 7, at least one of the second land portion 32 and the center land portion 33 preferably includes a road contact surface that bulges toward the outer side in the tire radial direction from the tread profile PL1. In this configuration, the maximum bulging amount Hp of the road contact surface is preferably in a range of 0.1 mm≤Hp≤0.5 mm, and more preferably is in a range of 0.2 mm≤Hp≤0.4 mm. In the configuration of FIG. 7, the road contact surface of the land portion 32 (33) bulges in an arc shape across the entire width direction of the land portion 32 (33). The maximum bulging amount Hp of the road contact surface and the width Wb of the land portion 32 (33) preferably have a relationship of 0.05≤Hp/Wb≤0.25, and more preferably have a relationship of 0.07≤Hp/Wb≤0.20. As a result, the maximum bulging amount Hp of the road contact surface is made appropriate.

The maximum bulging amount Hp of the road contact surface is measured as the maximum distance from the reference contour line (PL1) to the road contact surface of the land portion.

The width Wb of the land portion is measured as the distance in the tire width direction of the measurement points having the groove width of the left and right circumferential main grooves defining the land portion when the tire is mounted on a specified rim, inflated to the specified internal pressure, and in an unloaded state.

Particularly, in a configuration in which the tire ground contact width is large and the land portion 32 (33) is a rib that is continuous in the tire circumferential direction, there is a problem that the ground contact pressure distribution within the land portion 32 (33) tends to be non-uniform. In this regard, when the land portion 32 (33) includes the bulging road contact surface, the ground contact pressure distribution within the land portion 32 (33) is made uniform.

Effects

As described above, the pneumatic tire 1 includes the carcass layer 13, the pair of cross belts disposed on the outer side in the radial direction of the carcass layer 13, and the tread rubber 15 disposed on the outer side in the radial direction of the cross belts 141 and 142 (see FIG. 1). The tread profile PL1 when the tire is mounted on a specified rim, inflated to the specified internal pressure, and in an unloaded state is defined by the following elliptic function having a center point on the tire equatorial plane CL. Here, "a" is a radius in a tire width direction and a major axis, "b" is a radius in a tire radial direction and a minor axis, and conditions of 0<b<a, 0<x, 0<y, 1.00<p, 1.00<q, and p≠q are satisfied.

$$\left(\frac{x}{a}\right)^p + \left(\frac{y}{b}\right)^q = 1$$ [Mathmatical Formula 1]

In this configuration, the tire contact patch shape is flat, that is, the ground contact length of the ground contact region is made uniform, and the ground contact pressure distribution is made uniform. Due to this, there are advantages that cornering performance of a tire and uneven wear resistance performance of a tire are improved.

In the pneumatic tire 1, the radius a in the tire width direction preferably has a relationship of 0.30≤a/SW≤0.60 (see FIG. 2) with respect to the total tire width SW (see FIG. 1). An advantage that the tire ground contact width is ensured and the cornering force during cornering is ensured due to the lower limit described above is provided. An advantage that the ground contact pressure distribution in the tire ground contact region is made uniform, and the cornering force during cornering is ensured due to the upper limit described above is provided.

In the pneumatic tire 1, the index p is in a range of 1.00≤p≤7.00. An advantage that the tire ground contact width is ensured, and the cornering force during cornering is ensured due to the lower limit described above is provided. An advantage that the ground contact pressure distribution in the tire ground contact region is made uniform, and the cornering force during cornering is ensured due to the upper limit described above is provided.

In the pneumatic tire 1, the index p is in a range of 4.05≤p. In this configuration, an advantage that the index p is made appropriate and the cornering performance of the tire is effectively increased is provided.

In the pneumatic tire 1, the radius b in the tire radial direction has a relationship of 0.10≤b/a≤1.20 with respect to the radius a in the tire width direction. Advantages that the profile shape of the tread portion shoulder region is made appropriate due to the lower limit described above, and the ground contact pressure distribution is made appropriate and the cornering force increases due to the upper limit described above are provided.

In the pneumatic tire 1, the radius b in the tire radial direction has a relationship of 1.00<b/q≤30.0 with respect to the index q. Advantages that the amount of shoulder drop in the tread shoulder region is made appropriate due to the lower limit described above, and the ground contact area during traveling straight and the ground contact area during cornering are achieved in a compatible manner due to the upper limit described above are provided.

In the pneumatic tire 1, the index q is in a range of q≤1.95 or 4.05≤q. In this configuration, an advantage that particularly, since the index q is in the range of 4.05≤q, the ground contact pressure distribution is made uniform and the cornering force increases is provided.

In the pneumatic tire 1, the imaginary profile PL2 (see FIG. 2) of an elliptic function in which p=q=2 is defined so as to pass through the intersection points P1 and P4 between the tread profile PL1 and the tire equatorial plane CL and the tire ground contact edge T. In this case, the tread profile PL1 is offset toward the outer side in the tire radial direction with respect to the imaginary profile PL2 in a region of at least 35% to 60% of the distance from the tire equatorial plane CL to the tire ground contact edge T (see FIG. 3). In this configuration, the contact patch shape in the tread portion center region is flat, that is, the ground contact length is made uniform and the ground contact pressure distribution is made uniform. Due to this, an advantage that the uneven wear of the tread portion center region is suppressed is provided.

In the pneumatic tire 1, the imaginary profile PL2 (see FIG. 2) of an elliptic function in which p=q=2 is defined so as to pass through intersection points P1 and P4 between the tread profile PL1 and the tire equatorial plane CL and the tire ground contact edge T. In this case, the tread profile PL1 is offset toward the inner side in the tire radial direction with respect to the imaginary profile PL2 in a region of 95% or greater of the distance from the tire equatorial plane CL to the tire ground contact edge T. In this configuration, concentration of the ground contact pressure at the tire ground contact edge is alleviated, and the ground contact pressure during application of a lateral force is made uniform. Due to this, the cornering force increases.

In the pneumatic tire 1, the tread profile PL1 is preferably defined by the super-elliptic function in the entire region of the tire ground contact region at a camber angle of 0°. Due to this, an advantage that the tread profile of the tire ground contact region is made appropriate is provided.

In the pneumatic tire 1, the tread profile PL1 is defined by the super-elliptic function in a ground contact region from the tire equatorial plane CL to the camber angle of 4°. Due to this, there is an advantage that the tread profile is made appropriate, and the steering stability performance, the circuit running performance, and the wear resistance performance of the tire are improved.

In the pneumatic tire 1, the tread gauge Ga1 in the tire equatorial plane CL, the tread gauge Ga2 at the position of 60% of the distance from the tire equatorial plane CL to the tire ground contact edge T, and the tread gauge Ga3 at the tire ground contact edge T preferably have a relationship of Ga3<Ga2≤Ga1 (see FIG. 6). In this configuration, an advantage that, since the tread gauges Ga1 to Ga3 decrease as they advance from the tread portion center region toward the shoulder region, the tire ground contact pressure is made uniform is provided.

In the pneumatic tire 1, the tread profile PL1 is formed by approximating the super-elliptic function by using four or more connected arcs. Such a configuration also provides an advantage that the problem of the imaginary profile PL4 formed from the two-stage radius described above can be solved. Moreover, an advantage that the manufacturing process of the tire mold can be simplified is provided.

The pneumatic tire 1 includes a plurality of circumferential grooves 21 to 23 extending in the tire circumferential direction and the center land portion 33 and the second land portion 32 defined and formed by the circumferential main grooves 21 to 23 (see FIG. 1). At least one of the center land portion 33 and the second land portion 32 includes a road contact surface that bulges toward the outer side in the tire radial direction from the tread profile PL1 (see FIG. 7). The bulging amount Hp of the road contact surface is in a range of 0.1 mm≤Hp≤0.5 mm. This configuration provides an advantage that since the land portion 32 (33) includes the bulging road contact surface, the ground contact pressure distribution within the land portion 32 (33) is made uniform.

EXAMPLE

FIG. 8 is a table showing results of performance tests of pneumatic tires according to embodiments of the technology.

In the performance tests, (1) cornering performance and (2) wear resistance performance were evaluated for a plurality of types of test tires. Test tires having a tire size of 245/40R18 97Y were assembled on a rim having a rim size of 18×81/2 J, and an internal pressure of 250 kPa and a load of 6 kN were applied to the test tires. The test tires were mounted on all wheels of a four-wheel-drive sedan with an engine displacement of 2000 cc that was a test vehicle.

(1) In the evaluation of cornering performance, the test vehicle travels on a predetermined test course, and the travel time is measured. The measurement results are expressed as index values and evaluated with the Conventional Example being assigned as the reference (100). In this evaluation, the larger the values, the faster and the more preferable the travel time.

(2) In the evaluation of wear resistance performance, the amount of wear of the land portion after traveling for 3 million km is measured in a benchtop test using an indoor wear tester. The measurement results are expressed as index values and evaluated with the Conventional Example being assigned as the reference (100). In this evaluation, the larger the values, the better and the more preferable the wear resistance performance.

The test tire of Example 1 has the configuration of FIG. 1, and the tread profile PL1 is formed from the super-elliptic function described above. The total tire width SW is 245 mm and the tire ground contact width is 210 mm.

The test tires of Conventional Example have the configuration of Example 1 wherein the tread profile is an ellipse (p=q=0).

As can be seen from the test results, the cornering performance and the wear resistance performance of a tire are improved in the test tires of Examples 1 to 11.

The invention claimed is:

1. A pneumatic tire, comprising:

a carcass layer;

a pair of cross belts disposed on an outer side in a radial direction of the carcass layer; and a tread rubber disposed on the outer side in the radial direction of the pair of cross belts, a tread profile when the tire is mounted on a specified rim, inflated to a specified internal pressure, and in an unloaded state, being defined by an elliptic function (Mathematical Formula 1) below having a center point on a tire equatorial plane, where "a" is a radius in a tire width direction and a major axis, "b" is a radius in a tire radial direction and a minor axis, and conditions of $0<b<a$, $0<x$, $0<y$, $1.00<p$, $1.00<q$, and $p\neq q$ are satisfied, $$\left(\frac{x}{a}\right)^p+\left(\frac{y}{b}\right)^q=1; \quad \text{(Mathmatical Formula 1)}$$

wherein a radius b in the tire radial direction has a relationship of $0.10\leq b/a<1.0$ with respect to the radius a in the tire width direction.

2. The pneumatic tire according to claim 1, wherein a radius a in the tire width direction has a relationship of $0.30\leq a/SW\leq 0.60$ with respect to a total tire width SW.

3. The pneumatic tire according to claim 1, wherein an index p is in a range of $1.00\leq p\leq 7.00$.

4. The pneumatic tire according to claim 3, wherein the index p is in a range of $4.05\leq p$.

5. The pneumatic tire according to claim 1, wherein the radius b in the tire radial direction has a relationship of $1.00<b/q\leq 30.0$ with respect to an index q.

6. The pneumatic tire according to claim 5, wherein the index q is in a range of $q\leq 1.95$ or $4.05\leq q$.

7. The pneumatic tire according to claim 1, wherein an imaginary profile of an elliptic function where $p=q=2$ is defined so as to pass through intersection points P1 and P4 between the tread profile and the tire equatorial plane and a tire ground contact edge, and the tread profile is offset toward the outer side in the tire radial direction with respect to the imaginary profile in a region of at least 35% to 60% of a distance from the tire equatorial plane to the tire ground contact edge.

8. The pneumatic tire according to claim 1, wherein an imaginary profile of an elliptic function where $p=q=2$ is defined so as to pass through intersection points P1 and P4 between the tread profile and the tire equatorial plane and a tire ground contact edge, and the tread profile is offset toward an inner side in the tire radial direction with respect to the imaginary profile in a region of 95% or greater of a distance from the tire equatorial plane to the tire ground contact edge.

9. The pneumatic tire according to claim 1, wherein the tread profile is defined by the elliptic function in an entire region of a tire ground contact region at a camber angle of 0°.

10. The pneumatic tire according to claim 1, wherein the tread profile is defined by the elliptic function in a ground contact region from the tire equatorial plane to a camber angle of 4°.

11. The pneumatic tire according to claim 1, wherein a tread gauge Ga1 in the tire equatorial plane, a tread gauge Ga2 at a position of 60% of a distance from the tire equatorial plane to the tire ground contact edge, and a tread gauge Ga3 at the tire ground contact edge have a relationship of $Ga3<Ga2\leq Ga1$.

12. The pneumatic tire according to claim 1, wherein the tread profile is formed by approximating the elliptic function by using four or more connected arcs.

13. The pneumatic tire according to claim 1, comprising:

a plurality of circumferential grooves extending in a tire circumferential direction and a center land portion and a second land portion defined and formed by the plurality of circumferential grooves, wherein at least one of the center land portion and the second land portion comprises a road contact surface that bulges toward the outer side in the tire radial direction from the tread profile, and a bulging amount Hp of the road contact surface is in a range of $0.1\text{ mm}\leq Hp\leq 0.5\text{ mm}$.

14. A method for manufacturing a pneumatic tire, comprising:

assembling a carcass layer, a pair of cross belts disposed on an outer side in a radial direction of the carcass layer, and a tread rubber disposed on the outer side in the radial direction of the pair of cross belts, defining a tread profile configured for when the tire is mounted on a specified rim, inflated to a specified internal pressure, and in an unloaded state, the tread profile being defined by an elliptic function (Mathematical Formula 1) below having a center point on a tire equatorial plane, where "a" is a radius in a tire width direction and a major axis, "b" is a radius in a tire radial direction and a minor axis, and conditions of $0<b<a$, $0<x$, $0<y$, $1.00<p$, $1.00<q$, and $p\neq q$ are satisfied, $$\left(\frac{x}{a}\right)^p+\left(\frac{y}{b}\right)^q=1; \quad \text{(Mathmatical Formula 1)}$$

wherein a radius b in the tire radial direction has a relationship of $0.10\leq b/a<1.0$ with respect to the radius a in the tire width direction.

15. The pneumatic tire according to claim 1, wherein the index p is in a range of $2.50\leq p\leq 7.00$.

16. The pneumatic tire according to claim 1, wherein the index p is in a range of $4.05\leq p\leq 7.00$.

17. The pneumatic tire according to claim 1, wherein the index p is in a range of $5.01\leq p\leq 7.00$.

18. A pneumatic tire, comprising:

a carcass layer;

a pair of cross belts disposed on an outer side in a radial direction of the carcass layer; and a tread rubber disposed on the outer side in the radial direction of the pair of cross belts, a tread profile when the tire is mounted on a specified rim, inflated to a specified internal pressure, and in an unloaded state, being defined by an elliptic function (Mathematical Formula 1) below having a center point on a tire equatorial plane, where "a" is a radius in a tire width direction and a major axis, "b" is a radius in a tire radial direction and a minor axis, and conditions of $0<b<a$, $0<x$, $0<y$, $1.00<p$, $1.00<q$, $p\neq q$ and $6.00<b/q\leq 30.0$ are satisfied, $$\left(\frac{x}{a}\right)^p+\left(\frac{y}{b}\right)^q=1; \quad \text{(Mathmatical Formula 1)}$$

19. The pneumatic tire according to claim 18, wherein the index q is in a range of $q\leq 1.95$ or $4.05\leq q$.

20. The pneumatic tire according to claim 18, wherein the index q is in a range of $q\leq 1.80$ or $4.05\leq q$.

* * * * *